United States Patent
Bitton

(10) Patent No.: US 10,845,279 B1
(45) Date of Patent: Nov. 24, 2020

(54) METHOD AND SYSTEM FOR DETERMINING WASTE METAL BATCH COMPOSITION TAKING INTO ACCOUNT DIFFERENCES IN SURFACE AND INTERIOR COMPOSITION

(71) Applicant: House of Metals Company Limited, Toronto (CA)

(72) Inventor: Daniel Bitton, Toronto (CA)

(73) Assignee: HOUSE OF METALS COMPANY LIMITED, Toronto (CA)

( * ) Notice: Subject to any disclaimer, the term of this patent is extended or adjusted under 35 U.S.C. 154(b) by 0 days.

(21) Appl. No.: 16/780,081

(22) Filed: Feb. 3, 2020

Related U.S. Application Data

(60) Provisional application No. 62/856,818, filed on Jun. 4, 2019.

(51) Int. Cl.
*G01N 1/44* (2006.01)
*G01N 1/28* (2006.01)
(Continued)

(52) U.S. Cl.
CPC ............... *G01N 1/44* (2013.01); *C22B 1/005* (2013.01); *G01N 1/286* (2013.01); *G01N 21/718* (2013.01)

(58) Field of Classification Search
CPC ........ G01N 1/44; G01N 1/286; G01N 21/718; C22B 1/005
See application file for complete search history.

(56) References Cited

U.S. PATENT DOCUMENTS 3,905,556 A * 9/1975 Drage ..................... B02C 23/14
241/19
4,069,145 A * 1/1978 Sommer, Jr. ............. B03C 1/23
209/212
(Continued)

FOREIGN PATENT DOCUMENTS

CA 1110996 10/1981
JP 02083167 3/1990
(Continued)

OTHER PUBLICATIONS

Fan et al., "Examination and Simulation of Silicon Macrosegregation in A356 Wheel Casting", Metals, Jun. 29, 2018.
(Continued)

*Primary Examiner* — Bayan Salone
(74) *Attorney, Agent, or Firm* — Bereskin & Parr LLP/S.E.N.C.R.L.,s.r.l.

(57) ABSTRACT

Described herein is a method for recycling aluminum alloy wheels. The method includes the steps of providing a feed of aluminum alloy wheels of a particular alloy; fragmenting the aluminum alloy wheels into a plurality of fragments, such that newly exposed surfaces of the plurality of fragments have an interior composition; determining a newly exposed surface indicia for distinguishing each newly exposed surface in the feed of aluminum alloy wheels; determining an aggregate composition estimate by determining a plurality of composition measurements of the material of fragments of the plurality of fragments; and providing the plurality of fragments, and the aggregate composition estimate, for use in manufacturing at least one component made from aluminum alloy.

15 Claims, 6 Drawing Sheets

(51) Int. Cl.
*G01N 21/71* (2006.01)
*C22B 1/00* (2006.01)

(56) References Cited

U.S. PATENT DOCUMENTS

| | | | | |
|---|---|---|---|---|
| 4,136,778 A * | 1/1979 | Wortman | ............... | D06F 93/00 378/45 |
| 4,337,900 A * | 7/1982 | Williams | ............... | B03B 9/061 241/14 |
| 4,476,655 A * | 10/1984 | Ansbaugh | ............... | B24C 3/26 451/326 |
| 4,609,155 A * | 9/1986 | Garnier | ............... | B02C 18/24 241/101.2 |
| 4,848,590 A * | 7/1989 | Kelly | ............... | B07C 5/3427 209/564 |
| 4,965,968 A * | 10/1990 | Kelsall | ............... | B24C 1/003 451/99 |
| 5,060,871 A * | 10/1991 | Brassinga | ............... | C22B 7/005 241/3 |
| 5,133,505 A * | 7/1992 | Bourcier | ............... | B03B 9/061 209/212 |
| 5,314,072 A * | 5/1994 | Frankel | ............... | B07C 5/3408 209/44.1 |
| 5,333,797 A * | 8/1994 | Becker | ............... | B03B 9/06 241/19 |
| 5,443,157 A * | 8/1995 | Baker | ............... | B03B 9/061 209/12.1 |
| 5,663,997 A * | 9/1997 | Willis | ............... | G01N 23/223 378/44 |
| 5,738,224 A * | 4/1998 | Sommer, Jr. | ............... | B07C 5/3416 209/588 |
| 5,769,331 A * | 6/1998 | Yamagishi | ............... | B02C 19/0056 241/152.2 |
| 5,885,141 A * | 3/1999 | Watkin | ............... | B24C 3/062 451/87 |
| 6,375,106 B1 * | 4/2002 | Sears | ............... | B02C 18/142 241/236 |
| 6,422,493 B1 * | 7/2002 | Simon | ............... | B03B 9/061 209/12.1 |
| 6,527,206 B1 * | 3/2003 | Wuebbels | ............... | B29B 17/02 241/19 |
| 6,983,901 B2 * | 1/2006 | Bitton | ............... | C22B 7/005 241/24.14 |
| 7,086,618 B2 * | 8/2006 | Bitton | ............... | C22B 7/005 241/24.14 |
| 8,322,639 B2 * | 12/2012 | Gitschel | ............... | B03C 1/247 241/19 |
| 9,086,618 B2 * | 7/2015 | Suga | ............... | G03H 1/32 |
| 9,475,652 B2 * | 10/2016 | Nichols | ............... | B65G 47/48 |
| 10,220,418 B2 * | 3/2019 | Bitton | ............... | G01N 21/718 |
| 2005/0051645 A1 * | 3/2005 | Bitton | ............... | C22B 7/005 241/1 |
| 2005/0051647 A1 * | 3/2005 | Bitton | ............... | C22B 21/0069 241/25 |
| 2017/0173636 A1 * | 6/2017 | Bitton | ............... | B07C 5/34 |
| 2019/0091729 A1 * | 3/2019 | Gillner | ............... | B07C 5/3427 |

FOREIGN PATENT DOCUMENTS

| | | | |
|---|---|---|---|
| JP | 02160473 | 6/1990 | |
| WO | 9519454 | 7/1995 | |
| WO | 2018091617 A1 | 5/2018 | |
| WO | WO2018091617 | * 5/2018 | ............ B07C 5/342 |

OTHER PUBLICATIONS

Search Report and Written Opinion dated May 7, 2020, in respect of PCT/CA2020/050124.

* cited by examiner

METHOD AND SYSTEM FOR DETERMINING WASTE METAL BATCH COMPOSITION TAKING INTO ACCOUNT DIFFERENCES IN SURFACE AND INTERIOR COMPOSITION

CROSS REFERENCE TO RELATED APPLICATION

This application claims the benefit of U.S. Provisional Application No. 62/856,818 filed Jun. 4, 2019, the entirety of which is hereby incorporated by reference.

FIELD

The described embodiments relate to the field of recycling, in particular, the field of recycling waste metal and determining the composition of a batch of recyclable waste metal.

BACKGROUND

Recycling what would otherwise be waste materials to form new materials or objects is important in modern waste management. Many different materials can be recycled, for example, glass, paper, cardboard, metal, plastic, tires, textiles, batteries, and electronics. The typical method for recycling waste material includes pickup, sorting, cleaning, and processing.

SUMMARY

This summary is intended to introduce the reader to various aspects of the applicant's teaching, but not to define any specific embodiments. In general, disclosed herein are one or more methods recycling waste metal.

In a first aspect, some embodiments of the invention provide a method of recycling aluminum alloy wheels, the method including: (1) providing a feed of aluminum alloy wheels of a particular alloy, each aluminum alloy wheel of the feed of aluminum alloy wheels having a surface composition and an interior composition, the surface composition being a composition at an exterior surface of the aluminum alloy wheel, and the interior composition being a composition at an interior of the aluminum alloy wheel; (2) fragmenting the aluminum alloy wheels into a plurality of fragments, such that newly exposed surfaces of the plurality of fragments have the interior composition; (3) determining a newly exposed surface indicator for distinguishing each newly exposed surface in the feed of aluminum alloy wheels from the exterior surface; (4) determining an aggregate composition estimate by determining a plurality of composition measurements of the material of fragments of the plurality of fragments, at least some of the plurality of composition measurements being of newly exposed surfaces of the plurality of fragments, and then estimating the composition of the material of the fragments based on the plurality of composition measurements of the material of that fragment and the newly exposed surface indicator; and, (5) providing the plurality of fragments, and the aggregate composition estimate, for use in manufacturing at least one component made from aluminum alloy.

In some embodiments, the newly exposed surface identifier is a surface/interior quantity for the feed of aluminum alloy wheels, determined based on expected differences in the surface composition and the interior composition for the feed of aluminum alloy wheels.

In some embodiments, determining the plurality of composition measurements of the material of the fragments of the plurality of fragments includes: (1) heating the material to a point where the material will emit a characteristic radiation while cooling down, (2) operating a sensor to detect that characteristic radiation, and (3) operating a processor to analyze the characteristic radiation to determine the composition measurements of the material.

In some embodiments, determining the surface/interior quantity for the feed of aluminum allow wheels includes, for each fragment of at least one fragment of the aluminum alloy wheel of the particular alloy, (1) determining the surface composition of that fragment; (2) determining the interior composition of that fragment; and (3) determining the surface/interior quantity from the surface composition and the interior composition.

In some embodiments, the surface/interior quantity includes a classification criterion for distinguishing a surface composition measurement from an interior composition measurement.

In some embodiments, determining the aggregate composition estimate includes, for each composition measurement of the plurality of composition measurements of the material of fragments of the plurality of fragments, using the classification criterion to determine when that composition measurement is an interior composition measurement. When that composition measurement is an interior composition measurement, using that composition measurement in determining the aggregate composition estimate. When that composition measurement is not an interior composition measurement, determining the aggregate composition estimate without using that composition measurement.

In some embodiments, the surface/interior quantity further includes a surface/interior correlation for calculating the interior composition of a fragment from the surface composition of a fragment.

In some embodiments, determining the aggregate composition estimate includes, for each composition measurement of the plurality of composition measurements of the material of fragments of the plurality of fragments, using the classification criterion to determine when that composition measurement is an interior composition measurement. When that composition measurement is an interior composition measurement, using that composition measurement in determining the aggregate composition estimate without adjusting that composition measurement using the surface/interior correlation. When that composition measurement is a surface composition measurement, adjusting that composition measurement using the surface/interior correlation when using that composition measurement to determine the aggregate composition estimate in determining the aggregate composition estimate.

In some embodiments, the classification criterion includes different classification criteria for different elements.

In some embodiments, fragmenting the aluminum alloy wheels into a plurality of fragments further includes shot blasting the plurality of fragments to clean non-aluminum contaminants off the plurality of fragments.

In some embodiments, the classification criterion includes an element range of an element and each composition measurement of the plurality of composition measurements of the material of fragments of the plurality of fragments includes an element measurement for that element. In this embodiment, determining the aggregate composition estimate includes, for each composition measurement of the plurality of composition measurements of the material of fragments of the plurality of fragments, using the classification criterion to determine when that composition measurement is an interior composition measurement or a surface composition measurement by determining if the element measurement for that composition measurement falls in the element range of that element.

In some embodiments, the classification criterion includes a plurality of element ranges, including, for each element of a plurality of elements, an element range for that element. Each composition measurement of the plurality of composition measurements of the material of fragments of the plurality of fragments comprises, for each element of a plurality of elements, an element measurement for that element. In this embodiment, determining the aggregate composition estimate comprises for each composition measurement of the plurality of composition measurements of the material of fragments of the plurality of fragments, using the classification criterion to determine when that composition measurement is an interior composition measurement or a surface composition measurement by determining, for each element of a plurality of elements, if the element measurement for that composition measurement falls in the element range of that element.

In some embodiments, the surface/interior correlation includes an element correlation for an element and each composition measurement of the plurality of composition measurements of the material of fragments of the plurality of fragments comprises an element measurement for that element. In this embodiment, for each surface composition measurement, adjusting that composition measurement using the surface/interior correlation comprises adjusting the element measurement based on the element correlation.

In some embodiments, the surface/interior correlation includes a plurality of element correlations, including, for each element of a plurality of elements, an element correlation for that element. In this embodiment, each composition measurement of the plurality of composition measurements of the material of fragments of the plurality of fragments comprises, for each element of a plurality of elements, an element measurement for that element. In this embodiment, for each surface composition measurement, adjusting that composition measurement using the surface/interior correlation comprises, for each element of a plurality of elements, adjusting that element measurement based on that element correlation.

In some embodiments, fragmenting the aluminum alloy wheels into a plurality of fragments includes imparting at least part of the newly exposed surface indicator to the newly exposed surfaces.

According to some aspects, a system for recycling aluminum alloy wheels includes: (1) a conveyor for providing a feed of aluminum alloy wheels of a particular alloy, each aluminum alloy wheel of the feed of aluminum alloy wheels having a surface composition and an interior composition, the surface composition being a composition at an exterior surface of the aluminum alloy wheel, and the interior composition being a composition at an interior of the aluminum alloy wheel; (2) a fragmenting unit for receiving the feed of aluminum alloy wheels from the conveyor and for fragmenting the aluminum alloy wheels into a plurality of fragments, such that newly exposed surfaces of the plurality of fragments have the interior composition; (3) at least one sensor for sensing the plurality of fragments produced by the fragmenting unit to determine: (a) a newly exposed surface indicator for distinguishing each newly exposed surface in the feed of aluminum alloy wheels from the exterior surface; and (b) a plurality of composition measurements of the material of fragments of the plurality of fragments, at least some of the plurality of composition measurements being of newly exposed surfaces of the plurality of fragments; and (4) at least one processor for determining an aggregate composition estimate by estimating the composition of the material of that fragment based on the plurality of composition measurements of the material of that fragment and the newly exposed surface indicator, the processor being linked for communication with the at least one sensor.

In some embodiments, the system further includes a laser for heating a portion of at least one fragment of the plurality of fragments to a point where the at least a portion will emit a characteristic radiation while cooling down. The at least one sensor including a spectrometer for measuring that characteristic radiation. The spectrometer is linked for communication to the at least one processor to communicate the characteristic radiation measured to the at least one processor. In operation, a processor of the at least one processor operating a processor to analyze the characteristic radiation to determine the composition measurements of the at least one fragment.

In some embodiments, the system further includes a blast chamber for receiving the plurality of fragments from the fragmenting apparatus and for subjecting the plurality of fragments to shot blasting before providing the plurality of fragments to the at least one sensor.

BRIEF DESCRIPTION OF THE DRAWINGS

These and other advantages of the instant invention will be more fully and completely understood in conjunction with the following detailed description of embodiments and aspects of the present invention with reference to the following drawings, in which.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

Figure 1:
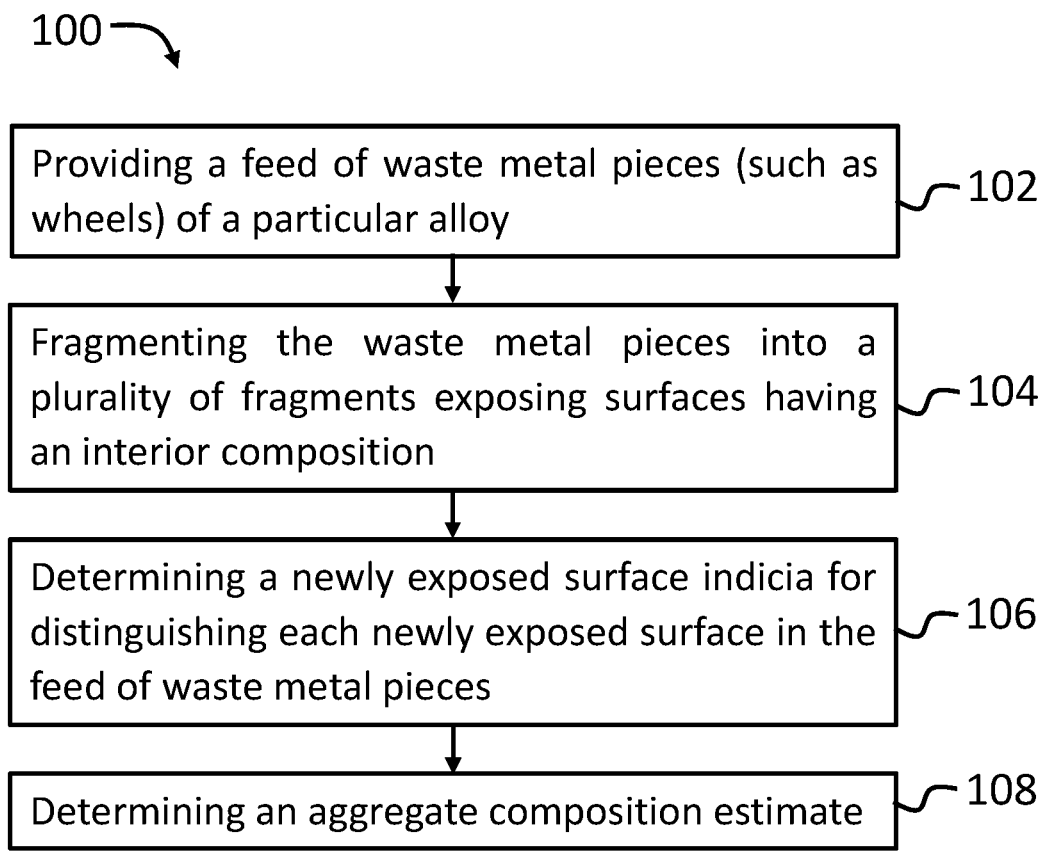
FIG. 1, in a flow chart, illustrates a method for determining a batch composition of a feed of waste metal pieces.

Reference is first made to FIG. 1, in which a method 100 for determining a batch composition of a feed of waste metal pieces is shown. Method 100 begins at step 102, in which a feed of waste metal pieces is provided. The waste metal pieces provided at step 102 are of a particular alloy type. For example, the feed of waste metal pieces may be a feed of aluminum alloys. In other examples, the feed of waste metal pieces may be a feed of any one of bismuth alloys, brass alloys, cobalt alloys, copper alloys, gallium alloys, gold alloys, indium alloys, iron alloys, lead alloys, magnesium alloys, mercury alloys, nickel alloys, potassium alloys, silver alloys, steel alloys, tin alloys, titanium alloys, zinc alloys, zirconium alloys, etc.

In some examples of method 100, although each piece of waste metal in the feed is made of the same alloy type, each piece can have a composition that is different that the composition of at least one of the other pieces in the feed. In some examples, a piece may be one composition of two different compositions present in the feed. In other examples, a piece of waste metal may have one composition of any number of different compositions present in the feed of waste metal. The batch of waste metal pieces has an aggregate or batch composition based on the different compositions of the different pieces of waste metal, as well as the relative masses of those pieces of waste metal. For example, if all pieces of waste metal are melted down and mixed to provide a homogeneous aggregate or mixture, then this aggregate or batch composition would be the composition of that homogenous mixture. This batch composition of the feed of waste metal pieces may be unknown when the pieces of waste metal are initially provided.

This feed of waste metal may all originate from the same kind of components being recycled. For example, a feed of aluminum alloy wheels of a particular alloy, such as aluminum alloy 356.2. Despite all the wheels being of a particular alloy type, they may nonetheless differ slightly in composition. Also, there may be variations in composition within a particular fragment or piece of waste metal as some elements, such as iron and silicon, may tend to migrate toward or away from the surface of the component being recycled. Thus, surfaces of pieces of waste metal that were once exterior surfaces of the wheel from which these pieces of metal stem, may have higher or lower concentrations of elements such as silicon than would be measured in the interior of these pieces.

At step 104 of method 100, the waste metal pieces are fragmented into a plurality of fragments. By fragmenting the waste metal pieces, internal surfaces of the waste metal pieces can be exposed. The internal surfaces of the waste metal pieces may have a surface composition equal to, or approximately equal to, an internal composition of the respective waste metal piece. Since the internal composition of a waste metal piece may more accurately represent the aggregate composition of that piece, the composition of the batch of pieces may be more accurately estimated using internal surface composition measurements.

The surface composition of an exterior surface can also be different than the internal composition because the exterior surface may have been oxidized, rusted, or may have been doped during the original manufacturing process of the waste metal piece.

At step 106, a newly exposed surface indicator or indicia for distinguishing each newly exposed surface in the feed of waste metal pieces is determined. Determining the newly exposed surface indicia may be used to detect the newly exposed surface during the remaining steps of method 100.

In one example, distinguishing each newly exposed surface includes fragmenting the waste metal pieces in such a way that the newly exposed surface can be geometrically distinguished from other, longer exposed surfaces (these longer exposed surfaces may have been surfaces of the component being recycled, and thus may have been exposed for much longer period of time that the newly exposed surfaces). For example, if a piece is fragmented along a long axis of that piece, then this long axis can provide a newly exposed surface indicia for indicating the newly exposed surface at a location intermediate the two ends of that fragment along the long axis. In a second example, a signature could be imparted on the newly exposed surface of the fragmented waste metal piece during the fragmentation step. In this example, the newly exposed surface can be located by searching for and detecting the signature. A signature may be, for example, a specific shape, cut line, stamp or pattern placed on the newly exposed surface of the fragments. In a third example, discussed in more detail below, a newly exposed surface indicia may be a surface/interior quantity.

At step 108 of the method 100, an estimate of the aggregate composition of the feed of waste metal pieces is determined. An estimate of the aggregate composition can be determined by taking a plurality of composition measurements of the material of fragments of the plurality of fragments at newly exposed surfaces thereof, and calculating an average composition. The composition measurements of the material of fragments can be estimated based on the plurality of composition measurements of the material of that fragment and the newly exposed surface indicia.

For example, say that a composition of the material of a fragment is measured at a surface of the fragment. Then if the surface at which the composition measurement is made, is identified as a newly exposed surface using the newly exposed surface indicia, that composition measurement can be categorized as an interior surface composition measurement that can be used in calculating average composition without adjusting the value of the measured composition. However, if the surface at which composition measurement is made is not identified as a newly exposed surface using the newly exposed surface indicia, then the composition measurement of the material of a fragment can be categorized as an exterior surface composition measurement using the newly exposed surface indicia, and that composition measurement may be ignored or adjusted when determining the batch composition as the exterior surface composition does not accurately represent the interior composition. In some embodiments, the newly exposed surface indicia may be an attribute of the composition measurement itself, such that whether or not the surface is a newly exposed surface can be determined from the composition measurement itself based on the concentrations of different elements, such as iron or silicon, as described in more detail below.

In some examples of method 100, a laser scanner can be used to determine the composition measurements. This can involve heating the material at a point on the surface of the fragment using a laser to a temperature at which that material will emit a characteristic radiation while cooling down. A sensor can then be operated to detect that characteristic radiation to provide a spectrum of signal magnitudes at different frequencies. This spectrum of signal magnitudes at different frequencies can then be analyzed by a computer processor to infer the relative concentrations of different elements within the alloy, as described, for example, in U.S. Pat. No. 10,220,418, incorporated herein by reference.

In one example of method 100, a "Laser-Induced Breakdown Spectroscopy" ("LIBS") composition analyzer manufactured by Laser Distance Spectrometry may be adapted as the laser scanner and sensor. The LIBS composition analyzer may include a radiation emitter, such as an Nd:YAG laser. The laser may shine at a frequency ranging from 1 to 20 hertz, thereby raising the temperature of the fragments at the point of contact between the fragments and the laser to above 30,000 degrees Celsius and generating plasma. The plasma may quickly cool down, returning the energized ions into a low energy state. While returning to the low energy state, the ions may emit characteristic radiation. The LIBS composition analyzer may contain one or more sensors that detect the characteristic radiation. A processor may then analyze readings obtained from the sensors and determine from them the concentration of the constituents contained in the material undergoing the temperature change. The processor may be disposed within the composition analyzer. Alternatively, the processor may be a remote processor.

Other suitable composition analyzers may include composition analyzers that use laser spectroscopy or other systems that rely on other methods of inducing characteristic radiation to be emitted by a material of each fragment at a surface of that fragment and detecting and analyzing that characteristic radiation to determine a composition of that material. The composition analyzers may detect the characteristic radiation by using any suitable sensor—for example, suitable sensors may include complementary metal-oxide-semiconductor (CMOS), high density, short channel metal-oxide-semiconductor (HMOS), charge-coupled device (CCD), and other types of sensors.

Suitable composition analyzers may use, for example, radiation emitters such as plasma, electron beam, or any other radiation emitters suitable to heat a material of each fragment in at least one spot on a surface of that fragment to a point where the material will emit a sufficient quantity and quality of characteristic radiation while cooling down so as to permit a sensor to detect that characteristic radiation and to allow for a processor to determine a composition of the material from that characteristic radiation. The composition analyzer can be adapted to withstand continuous use, as well as typical conditions that may be present in a particular aluminum alloy rim recycling operation. Such conditions may include vibrations resulting from the operation of aluminum alloy rim transfer mechanisms, and dust and other particles produced in the recycling process.

Figure 2:
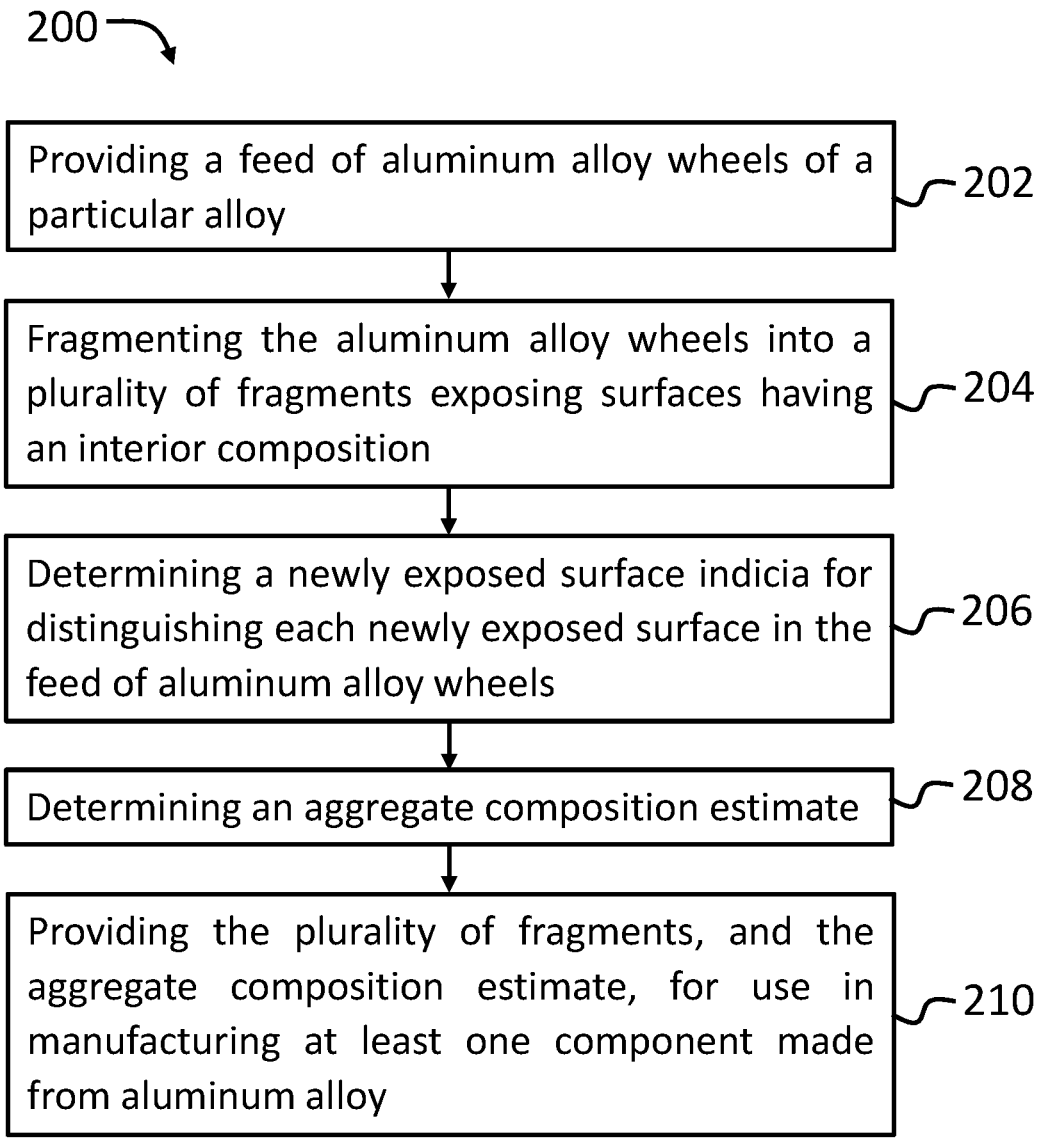
FIG. 2, in a flow chart, illustrates a method of recycling aluminum alloy wheels.

Referring now to FIG. 2, shown therein is method 200 of recycling aluminum alloy wheels. Method 200 of recycling aluminum alloy wheels is an example of an application of method 100 of determining a batch composition of a feed of waste metal pieces. Accordingly, any of the examples discussed below may be applied to method 100 and any examples discussed above in reference to method 100 can be applied to method 200. Moreover, the discussion below is not meant to limit the methods described herein to that of recycling aluminum alloy wheels. For example, the methods described herein may be applied to a method for recycling objects made of steel alloys, copper alloys, or any other suitable metal.

In step 202 of method 200, a feed of aluminum alloy wheels of a particular alloy is provided. Similar to the waste metal products described above, although the aluminum alloy wheels are of a particular alloy, the composition of the wheels may vary. Accordingly, the aggregate composition of a batch of aluminum alloy wheels may be unknown when the batch is initially provided.

At step 204, the aluminum alloy wheels are fragmented into a plurality of fragments. As described above, fragmenting the aluminum alloy wheels produces newly exposed surfaces that can have a surface composition approximately equal to that of the interior of the respective aluminum alloy wheel. In some examples, step 204 may include shot blasting the plurality of fragments to clean non-aluminum contaminants off the plurality of fragments.

At step 206 of method 200, a newly exposed surface indicator or indicia for distinguishing each newly exposed surface in the feed of aluminum alloy wheels is determined. The newly exposed surface indicia may be determined as described above. In some examples, the newly exposed surface indicia can be a surface/interior quantity for the feed of aluminum alloy wheels. The surface/interior quantity can be determined based on expected differences in the surface composition and the interior composition for the feed of aluminum alloy wheels. The surface/interior quantity is described in more detail below.

At step 208, an estimate of the aggregate composition of the batch is determined. In some examples of method 200, as was described above in reference to method 100, an estimate of the aggregate composition can be determined by taking a plurality of composition measurements of the material of fragments of the plurality of fragments at newly exposed surfaces thereof, and calculating an average composition of these composition measurements. The composition measurements of the material of fragments can be estimated based on the plurality of composition measurements of the material of that fragment and the newly exposed surface indicia.

Figure 3:
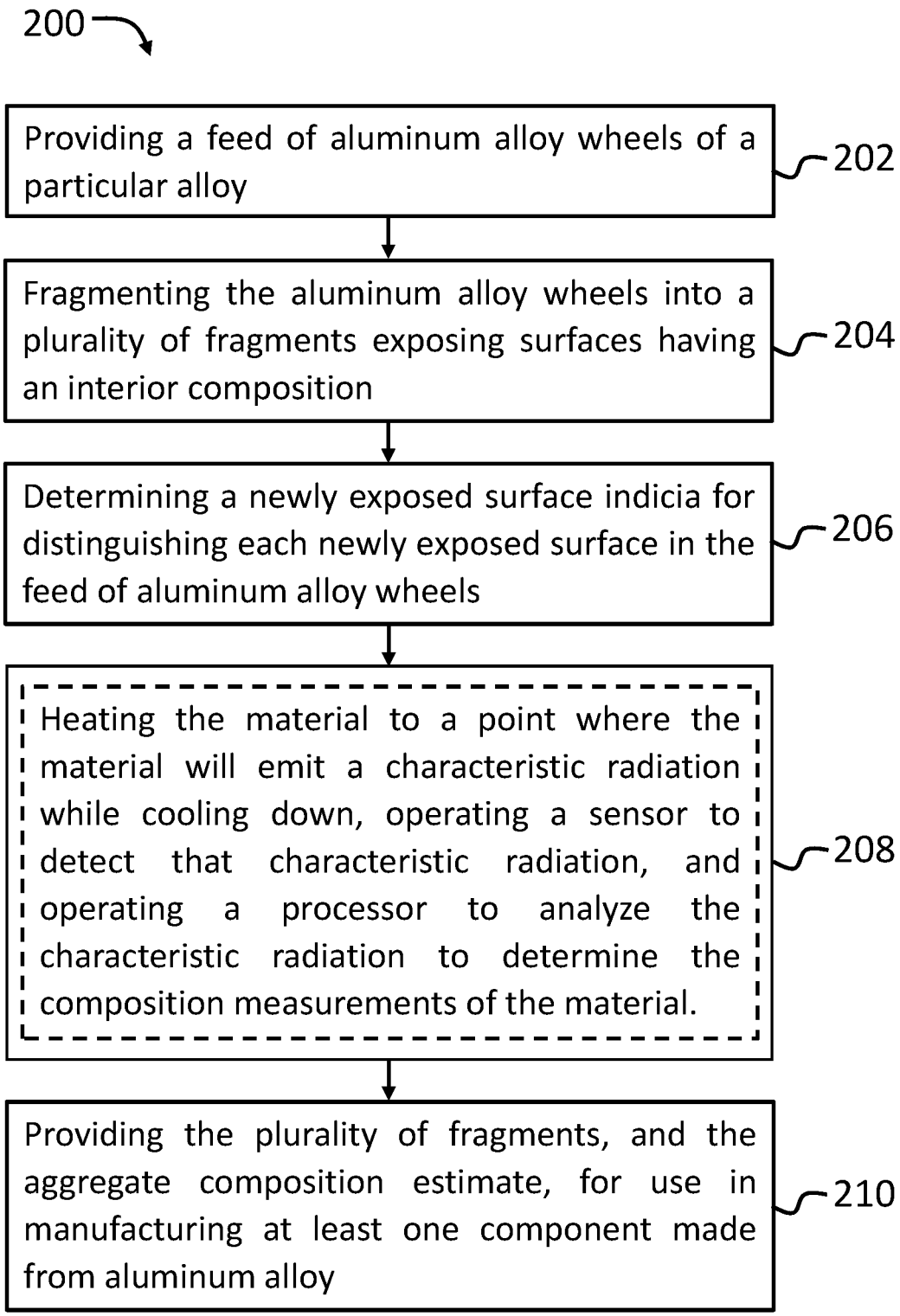
FIG. 3, in a flow chart, illustrates an alternative method of recycling aluminum alloy wheels of FIG. 2.

Referring now to FIG. 3, in some examples of method 200, the step of determining the plurality of composition measurements of the material of the fragments of the plurality of fragments, step 208, can include heating the material to a point where the material emits a characteristic radiation while cooling down. Step 208 can also include operating a sensor to detect that characteristic radiation, and operating a processor to analyze the characteristic radiation to determine the composition measurements of the material.

Referring back to FIG. 2, after the aggregate composition estimate is determined, at step 210 the plurality of fragments, along with the aggregate composition estimate, may be provided for use in manufacturing at least one component made from aluminum alloy. For example, if the aggregate composition of the batch is determined to be suitable for manufacturing motorcycle wheels, the batch may be recycled into motorcycle wheels. If the aggregate composition of the batch is determined to be suitable for manufacturing semi-truck wheels, the batch may be recycled into semi-truck wheels.

By determining the batch composition using the methods described herein, the fragments do not need to be melted and mixed together to determine the batch composition. Not having to melt and mix the fragments to determine the batch composition can increase the efficiency of the recycling process. For example, if the recycling facility and the wheel manufacturing facility are different entities at different locations, without using the method described above, the fragments may have to be melted twice, increasing the costs of the recycling process: (1) the fragments have to be melted at the recycling facility to determine the batch composition; (2) the fragments have to be melted at the manufacturing facility during the molding/die casting process. Alternatively, by utilizing the methods described herein, the fragments may only have to be melted once, at the manufacturing facility, where fine adjustments of the batch composition can be made if needed. The fragments can be supplied by the recycling facility to the manufacturing facility along with the batch composition so that the manufacturing facility can best decide how to use those fragments, and which other materials to combine them with if desired.

Figure 4:
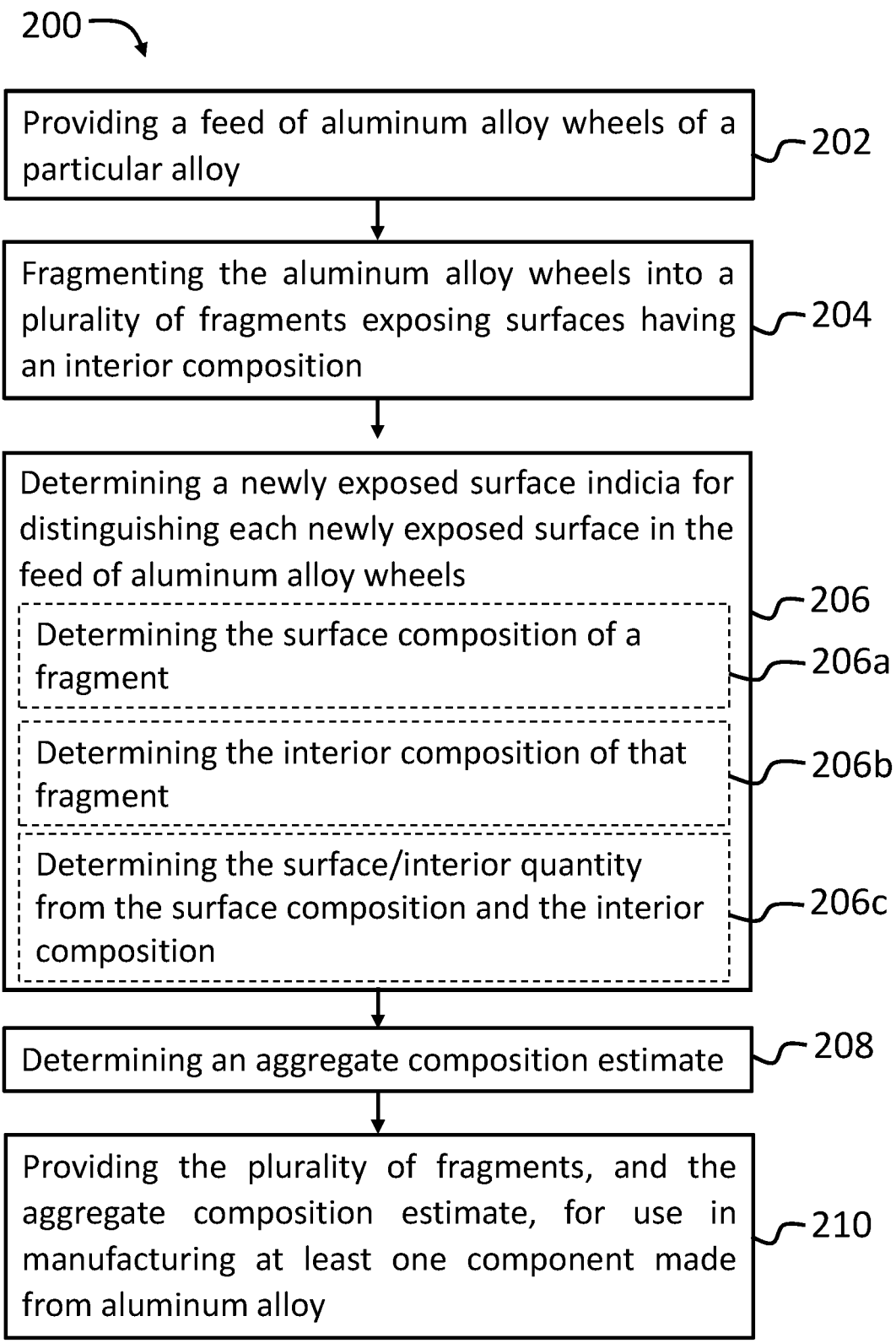
FIG. 4, in a flow chart, illustrates an alternative method of recycling aluminum alloy wheels of FIG. 2.

Referring now to FIG. 4, and as mentioned above, at step 206 the newly exposed surface identifier can be a surface/interior quantity for the feed of aluminum alloy wheels. The surface/interior quantity for the feed of aluminum wheels can be determined based on expected differences in the surface composition and the interior composition for the feed of aluminum alloy wheels. As an example, to determine the surface/interior quantity for the feed, first, at step 206a, the exterior surface composition of at least one fragment may be determined; second, at step 206b, the interior composition of the at least one fragment may be determined; and third, at step 206c, the surface/interior quantity for each fragment can be determined from the surface composition and the interior composition of that fragment. The batch surface/interior quantity, i.e., the newly exposed surface indicia, can be determined from the surface/interior quantities of each fragment, for example, by averaging. The surface/interior quantity can provide the newly exposed surface indicia as the surface/interior quantity can be used to determine whether a composition measurement is an interior surface measurement or an exterior surface measurement by where the measurement falls relative to the surface/interior quantity.

In some examples, the surface/interior quantity may comprise a composition measurement of an individual element, for example, silicon, found within the aluminum alloy wheel. In other examples, the surface/interior quantity may comprise a spectra of the compositions of all the individual elements or a subset of the individual elements found within the aluminum alloy wheel.

In some examples of method 200, the surface/interior quantity can include a classification criterion for distinguishing a surface composition measurement from an interior composition measurement. For example, it may be determined that aluminum alloy wheels of a particular alloy typically have an interior silicon composition in the range of X-Y and an exterior surface silicon composition in the range of A-B. These ranges, i.e., classification criterions, can be used to identify whether a composition measurement is an interior surface composition measurement or an exterior surface composition measurement. The surface/interior quantity may be representative of an individual element, as described above, or may be representative of a spectra of the elements found within the aluminum alloy wheels. In examples where the classification criterion is for an individual element, there may be more than one classification criterion and the classification criterions may vary, dependent on the element. For example, in addition to the interior and exterior silicon composition ranges, it may be determined that aluminum alloy wheels of a particular alloy typically have an interior iron composition in the range of X'-Y' and an exterior surface iron composition in the range of A'-B'

In an example of method 200 where the classification criterion includes an element range of a particular element, each composition measurement of the plurality of composition measurements of the material of fragments of the plurality of fragments determined at step 208 may include an element measurement for that element. Therefore, in this example, determining the aggregate composition estimate can include, for each composition measurement of the plurality of composition measurements of the material of fragments of the plurality of fragments, using the classification criterion to determine when that composition measurement is an interior composition measurement or a surface composition measurement. Whether a composition measurement is an interior composition measurement or a surface composition measurement can be determined by determining if the element measurement for that composition measurement falls in the element range of that element. In other examples, the classification criterion may include a plurality of element ranges, i.e., a spectra, and each composition measurement may include a measurement for the plurality of elements, and the aggregate composition can be estimated using the classification criterion to determine if a composition measurement is of an interior surface or an exterior surface, and the aggregate interior composition can then be calculated accordingly.

Figure 5:
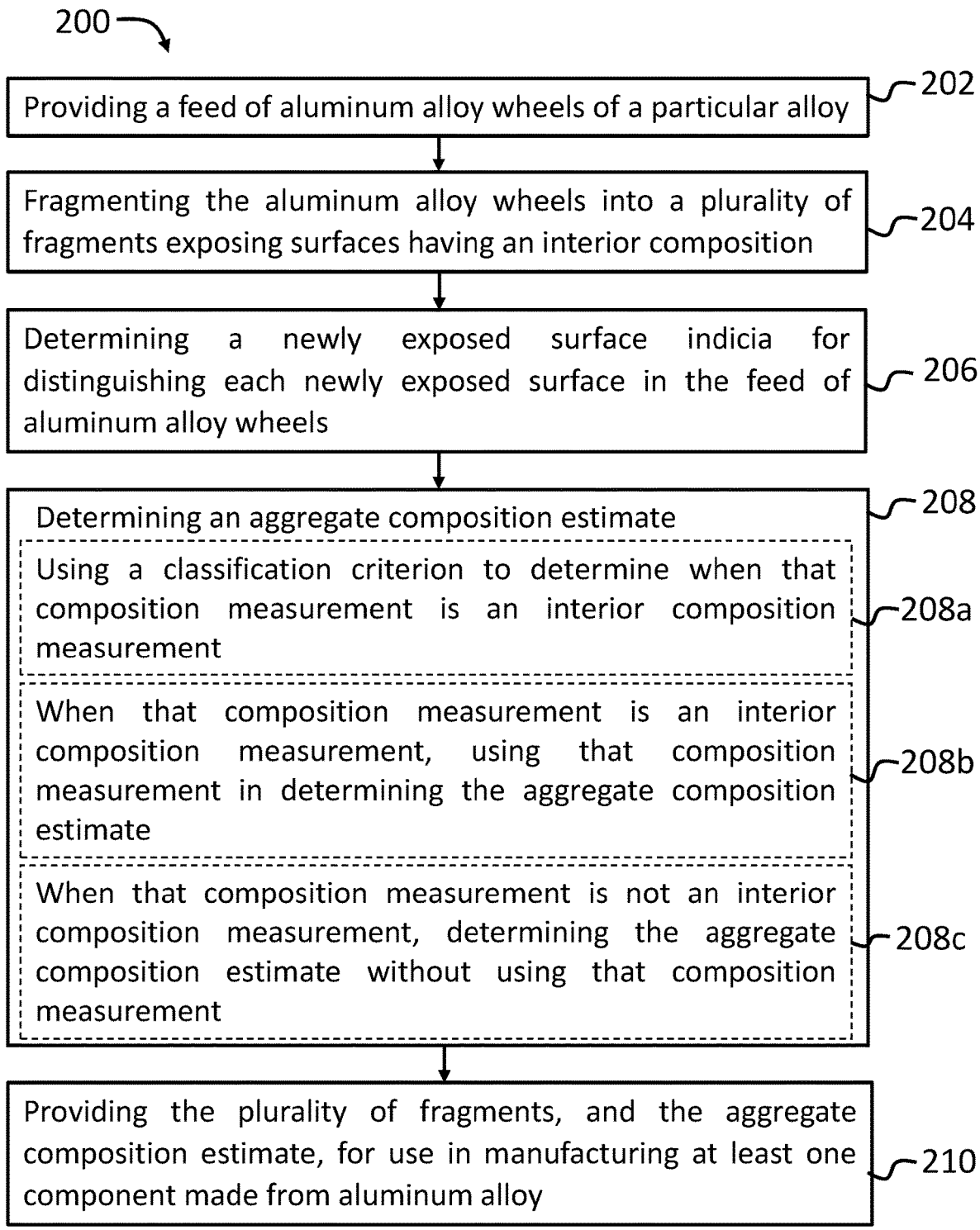
FIG. 5, in a flow chart, illustrates an alternative method of recycling aluminum alloy wheels of FIG. 2.

To summarize, in some examples, see for example, FIG. 5, at step 208 of method 200, determining the aggregate composition estimate can include (a) using the classification criterion to determine when that composition measurement is an interior composition measurement, step 208a; (b) when that composition measurement is an interior composition measurement, using that composition measurement in determining the aggregate composition estimate, step 208b; and (c) when that composition measurement is not an interior composition measurement, determining the aggregate composition estimate without using that composition measurement, step 208c.

In other examples of method 200, the surface/interior quantity may comprise a surface/interior correlation for calculating the interior composition of a fragment from the surface composition of a fragment. In these embodiments, rather than not using a composition measurement to determine the aggregate composition estimate because the composition measurement is not an interior composition measurement, an exterior surface composition measurement can be multiplied or divided by the surface/interior correlation to provide an estimate of the interior composition and can therefore be used when determining the aggregate composition estimate. Say, for example, that element "A" concentrations for interior composition measurements are found to be typically about 90% of element "A" concentrations in exterior surface composition measurement. Then, if a particular composition measurement is categorized as an exterior surface composition measurement (using, for example, the classification criterion), it can be adjusted by multiplying it by 0.9 before using this measurement to determine the aggregate composition estimate. In other examples of method 200, where the surface/interior correlation includes an element correlation for an element, when a surface measurement is detected, the composition measurement can be adjusted using the surface/interior correlation based on the element correlation.

In yet another example of method 200, the surface/interior correlation may comprise a plurality of element correlations, including, for each element of a plurality of elements, an element correlation for that element. In this example, each composition measurement of the plurality of composition measurements of the material of fragments of the plurality of fragments may comprise, for each element of a plurality of elements, an element measurement for that element. Then, for each surface composition measurement, adjusting that composition measurement using the surface/interior correlation may comprise, for each element of a plurality of elements, adjusting that element measurement based on that element correlation. Say, for example, that element "A" concentrations for interior composition measurements are found to be typically about 90% of element "A" concentrations in exterior surface composition measurement, while element "B" concentrations for interior composition measurements are found to be typically about 95% of element "B" concentrations in exterior surface composition measurement. Finally, say that element "C" concentrations for interior composition measurements are found to be typically about 110% of element "C" concentrations in exterior surface composition measurement. Then, if a particular composition measurement is categorized as an exterior surface composition measurement, it can be adjusted by multiplying its element "A" concentration by 0.9, its element "B" concentration by 0.95, and its element "C" concentration by 1.1 before using these measurements to determine the aggregate composition estimate.

In yet another example of method 200, determining the aggregate composition estimate can include (a) using the classification criterion to determine when that composition measurement is an exterior composition measurement; (b) when that composition measurement is an exterior composition measurement, using that composition measurement in determining the aggregate composition estimate; and (c) when that composition measurement is not an exterior composition measurement, determining the aggregate composition estimate without using that composition measurement. In this example of method 200, the surface/interior correlation can be used for each exterior composition measurement to calculate the corresponding interior composition of the fragment having that exterior composition measurement. That is, as described above, for each element in a plurality of element correlations of the surface/interior correlation, and for each exterior composition measurement, the exterior composition measurement of that element can be adjusted by multiplying that exterior composition measurement with the corresponding element correlation in the plurality of element correlations of the surface/interior correlation.

According to these three aspects of the invention, the aggregate composition estimate can be determined based i) only on the interior composition measurements; ii) only on the exterior composition measurements; or, iii) on both the interior and exterior composition measurements. In all three aspects, the interior and exterior composition measurements can be distinguished from each other using the classification criterion. In aspects ii) and iii), in which exterior composition measurements are used to determine the aggregate composition estimate, these exterior composition measurements can be adjusted by multiplying that exterior composition measurement with the corresponding element correlation in the plurality of element correlations of the surface/interior correlation.

Figure 6:
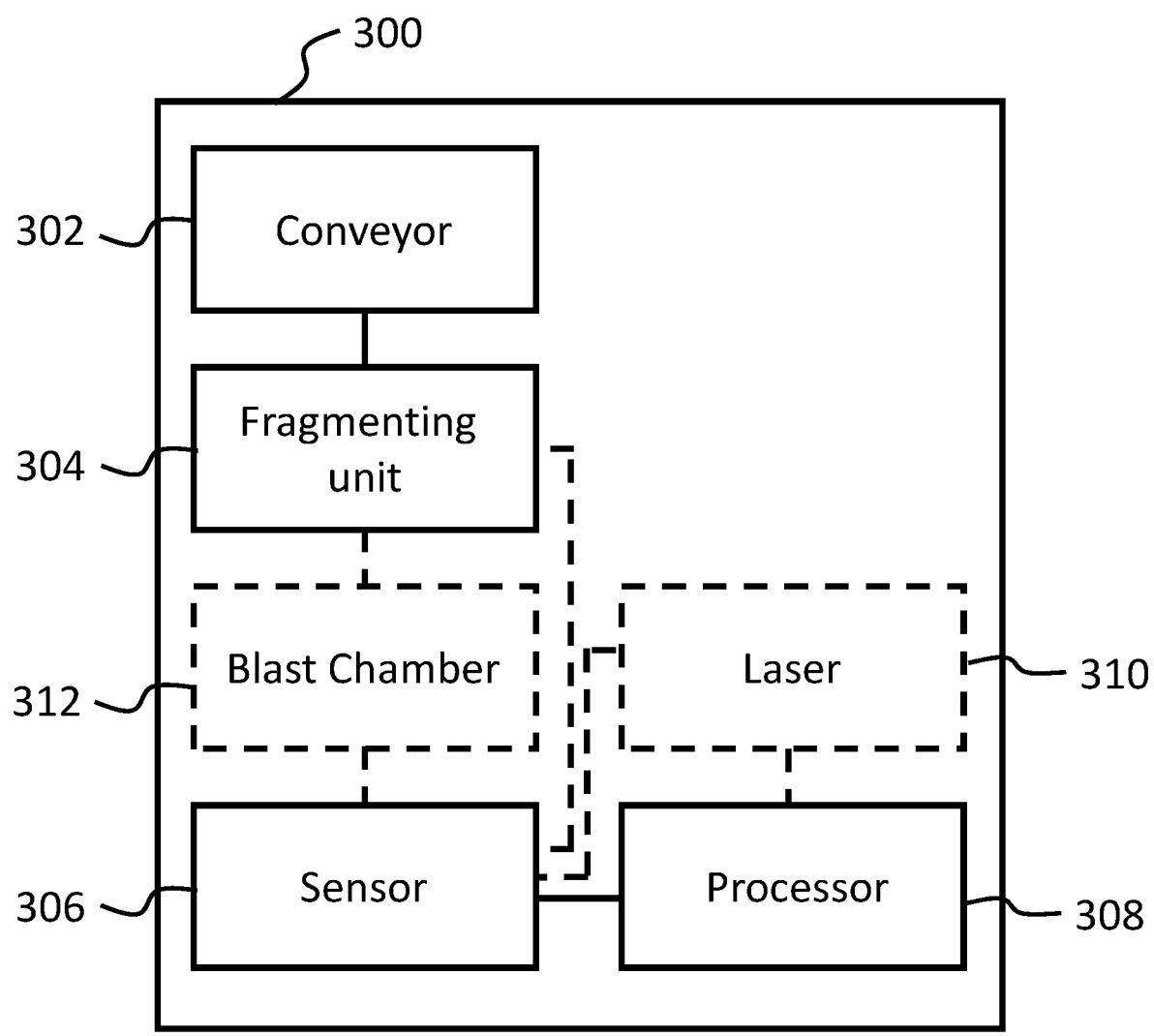
FIG. 6 is a block diagram showing a system for recycling waste metal pieces.

Referring now to FIG. 6, shown therein is a block diagram of a system 300 for recycling waste metal pieces. As shown, the system 300 for recycling waste metal pieces may include a conveyor 302, a fragmenting unit 304, at least one sensor 306, and at least one processor 308.

The conveyor 302 may provide a feed of waste metal pieces, such as, for example without limitation, aluminum alloy wheels, of a particular alloy. The waste metal pieces may be loaded onto the conveyor 302 by any suitable means (for example without limitation, by a truck dumping waste metal pieces into a hopper connected to one end of the conveyor 302 or manually by workers placing waste metal pieces on the conveyor). As was described above in reference to FIGS. 1-5, each waste metal piece provided by the conveyor 302 has a surface composition and an interior composition. The surface composition is a composition at an exterior surface of the waste metal piece, which is to say a surface that has been exposed for some time; for example, it may have been an exterior surface of the component now being recycled. The interior composition can be a composition at an interior of the waste metal piece. This interior composition measurement can be of interior of the component being recycled.

In some examples of the system 300 for recycling waste metal pieces, the fragmenting unit 304 receives the feed of waste metal pieces from the conveyor 302. The fragmenting unit 304 can fragment the waste metal pieces into a plurality of fragments, such that newly exposed surfaces of the plurality of fragments have the interior composition. In some examples, the fragmenting unit may be a shredder or a cutter and a plurality of blades may be used to cut the waste metal pieces into a plurality of fragments. In other examples, the fragmenting unit may be a waterjet cutter. In some examples, the cutting pattern may be random, and in other examples, the cutting pattern may be designed to place a signature on each fragment of the plurality of fragments.

The at least one sensor 306 of the system 300 may be used to sense the plurality of fragments produced by the fragmenting unit to determine (1) a newly exposed surface indicator or indicia for distinguishing each newly exposed surface in the feed of aluminum alloy wheels; and, (2) a plurality of composition measurements of the material of different fragments in the plurality of fragments. At least some of the plurality of composition measurements can be of newly exposed surfaces of the plurality of fragments. As described above, in some examples of the system 300 the at least one sensor 306 may include a laser spectroscopy device. In other examples, the at least one sensor 306 may include a system for locating and detecting a signature placed on each fragment of the plurality of fragments during fragmentation. In yet another example, the at least one sensor 306 may include a system for detecting the largest surface of a fragment.

The at least one processor 308 of the system 300 may be used to determine an aggregate composition estimate by estimating the composition of the material of that fragment based on the plurality of composition measurements of the material of that fragment and the newly exposed surface indicia. The at least one processor 308 may be linked for communication with the at least one sensor 306.

In examples where the at least one sensor 306 includes a laser spectroscopy device, the system may also include a laser 310 for heating a portion of the waste metal pieces to a point where the material will emit a characteristic radiation while cooling down. In this example, the laser spectroscopy device may measure that characteristic radiation and the laser spectroscopy device can be linked to the at least one processor 308 to analyze the characteristic radiation and to determine the composition measurements of the material. In some examples, the laser spectroscopy device may include a first processor of the at least one processor 308. This first processor can analyze the spectrum and determine percentage compositions of various elements. A second processor separate from the first processor of the at least one processor 308 may determine the aggregate batch composition. Alternatively, a single processor 308 may analyze the spectrum, determine percentage compositions of various elements, and then determine the aggregate batch composition.

The system 300 for recycling waste metal pieces may also include a blast chamber 312. Within the blast chamber 312, abrasives such as shot may be projected against the waste metal pieces to clean their surfaces (shot blasting). The impact of the shot with these surfaces can dislodge debris from the surfaces. The debris removed by blasting can include organic compounds, such as paint, clearcoat and rubber, as well as copper and chrome. In some examples of the system 300, the blast chamber 300 may be a centrifugal blasting apparatus. One half inch or larger S330 steel shot can be used.

The centrifugal blasting apparatus may include a housing that completely encloses a conveying means formed of a plurality of flights extending crosswise between endless chains for travel along a predetermined path. This housing can be sectioned into four compartments including one entrance chamber, two blast chambers, and one shakeout chamber. The flights in the blast chambers can be made of blast-resistant manganese rods, while the flights in the shakeout and entrance chambers can be made of less expensive lighter duty material. The debris removed from the waste metal pieces can be removed from the system in the shakeout chamber, and the spent abrasive can be re-circled back to the blast wheel.

The present invention has been described here by way of example only. Various modification and variations may be made to these exemplary embodiments without departing from the spirit and scope of the invention, which is limited only by the appended claims.

I claim:

1. A method of recycling aluminum alloy wheels, the method comprising:
   providing a feed of aluminum alloy wheels of a particular alloy, each aluminum alloy wheel of the feed of aluminum alloy wheels having a surface composition and an interior composition, the surface composition being a composition at an exterior surface of the aluminum alloy wheel, and the interior composition being a composition at an interior of the aluminum alloy wheel;
   fragmenting the aluminum alloy wheels into a plurality of fragments, such that newly exposed surfaces of the plurality of fragments have the interior composition;
   determining a newly exposed surface indicator for distinguishing each newly exposed surface in the feed of aluminum alloy wheels from the exterior surface;
   determining an aggregate composition estimate by determining a plurality of composition measurements of the material of fragments of the plurality of fragments, at least some of the plurality of composition measurements being of newly exposed surfaces of the plurality of fragments, and then estimating the composition of the material of the fragments based on the plurality of composition measurements of the material of that fragment and the newly exposed surface indicator; and,
   providing the plurality of fragments, and the aggregate composition estimate, for use in manufacturing at least one component made from aluminum alloy.

2. The method as defined in claim 1 wherein the newly exposed surface identifier is a surface/interior quantity for the feed of aluminum alloy wheels, determined based on expected differences in the surface composition and the interior composition for the feed of aluminum alloy wheels.

3. The method as defined in claim 2 wherein determining the plurality of composition measurements of the material of the fragments of the plurality of fragments comprises heating the material to a point where the material will emit a characteristic radiation while cooling down, operating a sensor to detect that characteristic radiation, and operating a processor to analyze the characteristic radiation to determine the composition measurements of the material.

4. The method as defined in claim 2 wherein determining the surface/interior quantity for the feed of aluminum allow wheels comprises, for each fragment of at least one fragment of the aluminum alloy wheel of the particular alloy,
   determining the surface composition of that fragment;
   determining the interior composition of that fragment; and,
   determining the surface/interior quantity from the surface composition and the interior composition.

5. The method as defined in claim 4 wherein the surface/interior quantity comprises a classification criterion for distinguishing a surface composition measurement from an interior composition measurement.

6. The method as defined in claim 5 wherein determining the aggregate composition estimate comprises for each composition measurement of the plurality of composition measurements of the material of fragments of the plurality of fragments,
   using the classification criterion to determine when that composition measurement is an interior composition measurement;
   when that composition measurement is an interior composition measurement, using that composition measurement in determining the aggregate composition estimate; and
   when that composition measurement is not an interior composition measurement, determining the aggregate composition estimate without using that composition measurement.

7. The method as defined in claim 5 wherein the surface/interior quantity further comprises a surface/interior correlation for calculating the interior composition of a fragment from the surface composition of a fragment.

8. The method as defined in claim 7 wherein determining the aggregate composition estimate comprises for each composition measurement of the plurality of composition measurements of the material of fragments of the plurality of fragments,
   using the classification criterion to determine when that composition measurement is an interior composition measurement;
   when that composition measurement is an interior composition measurement, using that composition measurement in determining the aggregate composition estimate without adjusting that composition measurement using the surface/interior correlation; and,
   when that composition measurement is a surface composition measurement, adjusting that composition measurement using the surface/interior correlation when using that composition measurement to determine the aggregate composition estimate in determining the aggregate composition estimate.

9. The method as defined in claim 5 wherein the classification criterion comprises different classification criteria for different elements.

10. The method as defined in claim 1 wherein fragmenting the aluminum alloy wheels into a plurality of fragments further comprises shot blasting the plurality of fragments to clean non-aluminum contaminants off the plurality of fragments.

11. The method as defined in claim 5 wherein
   the classification criterion comprises an element range of an element;
   each composition measurement of the plurality of composition measurements of the material of fragments of the plurality of fragments comprises an element measurement for that element; and,
   determining the aggregate composition estimate comprises for each composition measurement of the plurality of composition measurements of the material of fragments of the plurality of fragments, using the classification criterion to determine when that composition measurement is an interior composition measurement or a surface composition measurement by determining if the element measurement for that composition measurement falls in the element range of that element.

12. The method as defined in claim 5 wherein
the classification criterion comprises a plurality of element ranges, comprising, for each element of a plurality of elements, an element range for that element;
each composition measurement of the plurality of composition measurements of the material of fragments of the plurality of fragments comprises, for each element of a plurality of elements, an element measurement for that element; and,
determining the aggregate composition estimate comprises for each composition measurement of the plurality of composition measurements of the material of fragments of the plurality of fragments, using the classification criterion to determine when that composition measurement is an interior composition measurement or a surface composition measurement by determining, for each element of a plurality of elements, if the element measurement for that composition measurement falls in the element range of that element.

13. The method as defined in claim 7 wherein
the surface/interior correlation comprises an element correlation for an element;
each composition measurement of the plurality of composition measurements of the material of fragments of the plurality of fragments comprises an element measurement for that element; and,
for each surface composition measurement, adjusting that composition measurement using the surface/interior correlation comprises adjusting the element measurement based on the element correlation.

14. The method as defined in claim 7 wherein
the surface/interior correlation comprises a plurality of element correlations, comprising, for each element of a plurality of elements, an element correlation for that element;
each composition measurement of the plurality of composition measurements of the material of fragments of the plurality of fragments comprises, for each element of a plurality of elements, an element measurement for that element; and,
for each surface composition measurement, adjusting that composition measurement using the surface/interior correlation comprises, for each element of a plurality of elements, adjusting that element measurement based on that element correlation.

15. The method as defined in claim 1 wherein fragmenting the aluminum alloy wheels into a plurality of fragments comprises imparting at least part of the newly exposed surface indicator to the newly exposed surfaces.

* * * * *